United States Patent Office 3,591,433
Patented July 6, 1971

3,591,433
METHOD OF IMPREGNATING A TAPE WITH A THERMOSETTING ETHOXYLIN RESIN MIXTURE
Jostein Andreassen, Ojebyn, Sweden, assignor to Allmänna Svenska Elektriska Aktiebolaget, Vasteras, Sweden
Filed June 28, 1968, Ser. No. 741,007
Claims priority, application Sweden, June 29, 1967, 9,634/67
Int. Cl. H01b 13/30
U.S. Cl. 156—53                     4 Claims

ABSTRACT OF THE DISCLOSURE

A tape to be impregnated with a thermosetting resin has incorporated in it as a curing accelerator the reaction product of aluminum isopropylate and an alkyl amino alkyl phenol. Next, the tape is wrapped around a conductor or a bundle of conductors. The tape is then impregnated with a liquid mixture of an ethoxylin resin containing at least two epoxide groups per molecule and at least one anhydride of a polycarboxylic acid which serves as a curing agent. The article is then heated to cure the resin.

BACKGROUND OF THE INVENTION (1) Field of the invention

For a resin to be usable for impregnaiton processes in situation in which the turnover rate for the resin is low, it is in practice necessary that the pot life of the resin at impregnation and storage temperatures be quite long, that is, that the resin retains its properties, for example viscosity, unaltered while it is held in storage or in the impregnation vessel used. Another condition is that the resin shall not require an unfavorably long curing time or an unfavorably high curing temperature.

(2) The prior art

It has not been possible to fulfill both these requirements simultaneously for ethoxylin resin mixtures consisting of an ethoxylin resin and a curing agent of conventional type, such as a primary amine or an acid anhydride. Resins for which the pot life is acceptable require high curing temperatures and long curing times and resins for which the curing conditions are acceptable have unfavorably short pot life, that is, the properties of the resins alter during storage in the impregnation vessel so rapidly that after only short periods of use they must be replaced by freshly prepared resins. A long curing curing time for a resin has of course the disadvantage that the rate of manufacture is reduced for the product manufactured. The use of high curing temperatures may cause damaging internal stresses if the product consists of materials having different coefficient of thermal expansion. The shrinkage of the resin during the curing process will also be greater at high temperatures.

Problems of the above-mentioned type arise, among other things, within the electrical industry when impregnating electrical machines or apparatus or parts of such equipment. Large baths of impregnating resins are used for impregating such objects and the manufactured products are dipped into these continuously. The quantity of resin consumed is thus small in relation to the quantity of resin in the bath and is replaced when necessary by pouring in new resin. It is of the greatest importance that the resin in the bath maintains its properties, among other thing its viscosity, so that for each product to be impregnated the same impregnation conditions can be used, and that the maintenance of the constant properties of the resin is not gained at the cost of desired or useful curing conditions.

In order to solve the problems described a special method has previously been suggested which consists of incorporating a curing accelerator for the resin in the object to be impregnated. In the manufacture of, among other things, electric conductors insulated with mica tape which, after having been wrapped with the tape, are impregnated with an ethoxylin resin mixture containing an acid anhydride as curing agent, it is thus known to use a polyamide having free amino groups as the binder or as a component in the binder in the mica tape. Since the polyamide accelerates the curing of the resin mixture, it is in the known case possible to use an impregnation resin with relatively long pot life but otherwise high curing temperatures and long curing time.

SUMMARY OF THE INVENTION

According to the present invention, by using the known method of incorporating an accelerator in the object to be impregnated, it has been found possible both to increase the pot life and improve the curing conditions considerably. The pot life thus becomes practically unlimited and the curing time at a certain temperature considerably less than half that required when a polyamide is used as the accelerator. The method according to the invention also has the great advantage that it is extremely suitable in cases in which the impregnation is carried out under even very high vacuum.

The present invention relates to a method of manufacturing an object impregnated with a thermosetting ethoxylin resin mixture comprising a mixture of an ethoxylin resin containing at least two epoxide groups per molecule and at least one anhydride of a polycarboxylic acid serving as curing agent, in which a curing accelerator for the ethoxylin resin mixture is incorporated in the object before it is impregnated with the ethoxylin resin mixture, which is then liquid, and the resin taken up by the object during the impregnation is transferred to solid state by means of a curing reaction, characterised in that the curing accelerator is incorporated in the object and consists essentially of a reaction product of aluminum isopropylate and an alkyl amino alkyl phenol.

The alkyl amino phenol may consist of substances having the chemical formula:

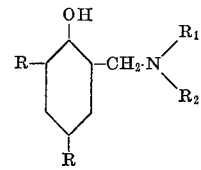

where R may be hydrogen, an alkyl group, an alkyl amino alkyl group or a dialkyl amino alkyl group and $R_1$ may be an alkyl group and $R_2$ a hydrogen atom or an alkyl group Examples of such alkyl amino alkyl phenols are:

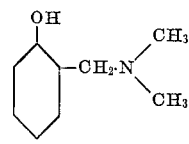

o-dimethyl amino methyl phenol

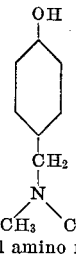

p-dimethyl amino methyl phenol

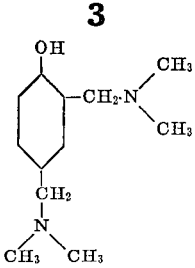

2,4-bis(dimethyl amino methyl) phenol

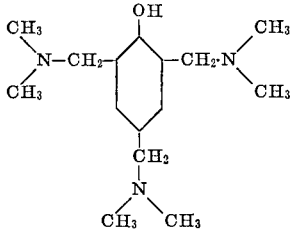

2,4,6-tris(dimethyl amino methyl) phenol

As an example of a reaction product of aluminum isopropylate and an alkyl amino alkyl phenol, the following may be mentioned where the alkyl amino alkyl phenol consists of 2,4,6-tris (dimethyl amino methyl) phenol:

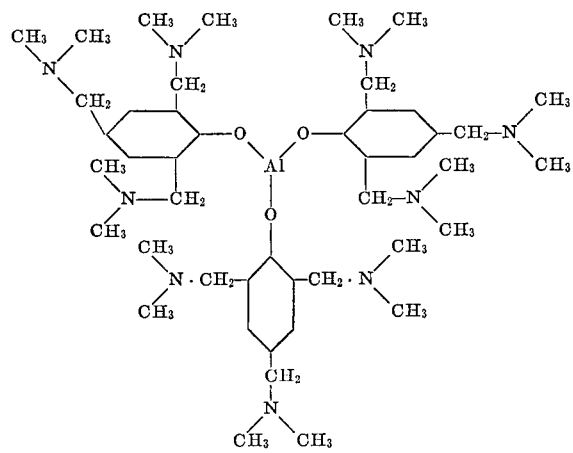

The quantity of reaction product incorporated in the object is suitably adjusted so that it comprises 0.2–5, preferably 0.5–3 percent of the total weight of the reaction product and the ethoxylin resin mixture taken up by the object.

The ethoxylin resin mixture contains suitably 30–80 percent by weight ethoxylin resin and 20–70 percent by weight curing agent, preferably 40–70 percent by weight ethoxylin resin and 30–60 percent by weight curing agent.

BRIEF DESCRIPTION OF THE DRAWINGS

The invention will be further described in connection with a case chosen as an example where the object consists of an electric conductor insulated with mica tape, with reference to the accompanying drawings where.

DESCRIPTION OF THE PREFERRED EMBODIMENT

Figure 1:
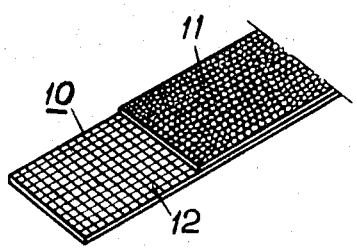
FIG. 1 shows a mica tape in which the reaction product of alkyl amino alkyl phenol and aluminum isopropylate is incorporated and FIG. 2 shows an electric conductor which has been wrapped with the mica tape according to FIG. 1.

The mica tape 10 according to FIG. 1 contains a mica foil 11 of small mica flakes overlapping each other. Such a foil can be manufactured according to known methods by splitting ordinary mica into very small flakes. The mica is first subjected to heat treatment after which the split mica obtained from this treatment is mixed with water to form a suspension and shaped into a sheet material according to a method similar to that used when manufacturing paper. The foil is attached to a woven glass tape backing material 12 with a conventional binder, not shown, such as for example a polyester resin or an ethoxylin resin.

The thickness of the mica foil 11 may be for example 0.09 mm. and of the glass weave 12, for example 0.04 mm. The quantity of binder should be sufficient for the mica foil to become attached to the glass weave.

According to the invention the tape 10 is impregnated with a 1% by weight solution of a reaction product of 2,4,6-tris(dimethyl amino methyl) phenol and aluminium isopropylate in methyl ethyl ketone. The reaction product is manufactured by first mixing 177 parts by weight 2,4,6-tris(dimethyl amino methyl) phenol and 47 parts by weight aluminium isopropylate and heating the mixture for 3 hours at 80° C. during stirring, after which the temperature is successively increased to 160° C. during distillation off of isopopyl alcohol.

Figure 2:
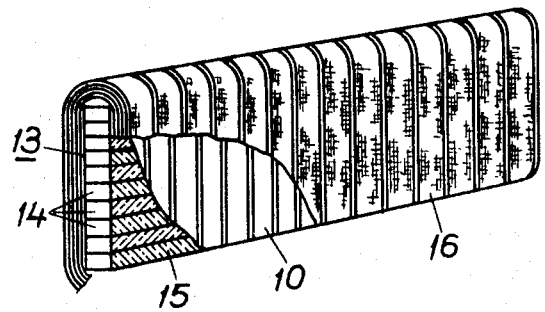

In accordance with FIG. 2 the impregnated mica tape 10 can be used for insulating, for example, a bundle of conductors 13 forming part of a high voltage coil. In the example the coil 13 consists of several individual conductors 14. The conductors are insulated from each other by being wound around with glass yarn 15 and impregnated with a binder, for example an ethoxylin resin, and alkyd resin, a phenolic resin or the like which is afterwards cured. For insulating the conductor bundle 13 it is wound around with the above-described insulating tape 10 for example with half overlap. When the whole bundle has been provided with an insulation consisting of a number, for example thirty, layers of insulating tape situated one on top of the other and also with a protective covering of glass tape 16 applied without overlap, the coil is first dried, suitably in vacuo, after which the insulated conductor is impregnated with a liquid ethoxylin resin mixture at room temperature, suitably also in vacuo. The ethoxylin resin mixture is prepared by mixing 10 parts by weight of an ethoxylin resin which is manufactured in known manner from epichlorohydrin and 4,4'-dioxidiphenyl-dimethyl methane and which has an exthoxylin equivalent weight of 192 and a viscosity of 10,000–12,000 cps. 25°, with 90 parts by weight of a curing agent consisting of a mixture of 75 parts by weight hexahydrophthalic acid anhydride and 15 parts by weight tetrahydrophthalic acid anhydride. Such a resin has a long pot life but has a long curing time and high curing temperature. During the impregnation the resin penetrates into the insulation of the conductor. Due to the fact that the reaction product of the alkyl amino alkyl phenol and the aluminium isopropylate in the insulating tape is difficult to dissolve in the impregnating resin the reaction product does not have time to dissolve and spread out into the resin in the impregnation vessel used. The impregnated object is then placed in a moulding tool to cure the impregnating resin. During the heating the reaction product is dissolved in the ethoxylin the normal conditions required for curing the ethoxylin resin mixture. When the moulding tool has reached a temperature of 140° C. this temperature is maintained for 2 hours.

In the same way as described above a conductor can be insulated with other tapes or sheets or insulating material than the mica tape described in which the reaction product of alkyl amino alkyl phenol and aluminium isopropylate is incorporated before the impregnation with the ethoxylin resin mixture. A conductor can thus be insulated with tape of sheets consisting of mica flakes or normal size attached to a glass weave serving as carrier material, or with tape or sheets consisting only of glass weave, asbestos paper or of filtered or woven fibrous material of some other type, for example polyethylene glycol terephthalate.

The method according to the invention can also be used for objects other than insulated electrical conductors, such as other insulated parts of electrical machines and apparatus. It can also be used in the manufacture of various laminated products, in which case the reaction product of alkyl amino alkyl phenol and aluminium isopropylate is incorporated in the reinforcing material, for example glass weave, asbestos, paper, before it is impregnated with ethoxylin resin mixture which is to serve as the binder in the laminate.

Other ethoxylin resins than that in the example may be used, which are produced by condensation of polyfunctional phenols, such as for example 4,4'-dioxidiphenyl-dimethyl methane, resorcinol or hydroquinone with epichlorohydrin in alkaline environment. Instead of epichlorohydrin it is also possible to use other substances reacting with phenolic hydroxyl groups, which bind epoxide groups to the phenol.

As acid anhydrides may be used, amongst other things, the acid anhydrides well known as curing agents for ethoxylin resins, phthalic acid anhydride, tetrahydro phthalic acid anhydride, hexa-hydrophthalic acid anhydride, maleic acid anhydride, succinic acid anhydride and mixtures of such anhydrides.

I claim:

1. A method of manufacturing an insulated electrical conductor element, the steps comprising incorporating an effective amount of a curing accelerator for an ethoxylin resin in an electrically insulating tape, said curing accelerator consisting essentially of a reaction product of aluminum isopropylate and an alkyl amino alkyl phenol in the proportions of substantially 3 mols alkyl amino alkyl phenol to 1 mol aluminum isopropylate, wrapping said insulating tape around the conductor element, impregnating the conductor element provided with the wrapping of insulating tape with a liquid thermosetting resin mixture comprising a mixture of an exthoxylin resin containing at least two epoxide groups per molecule and at least one anhydride of a polycarboxylic acid serving as curing agent, and curing the liquid thermosetting resin mixture to a solid resin.

2. A method according to claim 1, in which said conductor element comprises a bundle of several conductors.

3. Method according to claim 1, in which the alkyl amino alkyl phenol is dimethyl amino methyl phenol.

4. Method according to claim 1, in which the alkyl amino alkyl phenol is 2,4,6-tris(dimethyl amino methyl) phenol.

References Cited

UNITED STATES PATENTS

| | | | |
|---|---|---|---|
| 3,485,655 | 12/1969 | Cole et al. | 117—72 |
| 2,819,233 | 1/1958 | Smith et al. | 260—47X |
| 2,886,473 | 5/1959 | Schroeder | 117—161X |
| 2,891,026 | 6/1959 | Wasserman | 260—47X |
| 2,902,398 | 9/1959 | Schroeder | 117—161X |
| 3,186,958 | 6/1965 | Kutner et al. | 260—47X |
| 3,312,637 | 4/1967 | Durst et al. | 260—2 |
| 3,379,654 | 4/1968 | Seiz | 260—2 |

FOREIGN PATENTS

| | | | |
|---|---|---|---|
| 935,439 | 5/1963 | Great Britain | 117—161 |

WILLIAM D. MARTIN, Primary Examiner

M. R. P. PERRONE, Jr., Assistant Examiner

U.S. Cl. X.R.

117—54, 123, 126, 161